3,719,665
CHONDROITIN SULPHURIC ACID SALTS
Albert H. Beaufour and André Esanu, Paris, France, assignors to Societe d'Etudes de Produits Chimiques, Issy-les-Maulineaux, Hauts-de-Seine, France
No Drawing. Filed Aug. 23, 1971, Ser. No. 174,126
Int. Cl. C07c 69/32
U.S. Cl. 260—234 R    5 Claims

ABSTRACT OF THE DISCLOSURE

This invention relates to new salts of Chondroitin sulphuric acids, forms A and C, with betaine and pyridoxine. These compounds are useful for their therapeutic activity in the field of myocardial infarction and as anti-atheromatic agent.

Process for the preparation of the said compounds is indicated and pharmacological activity is described.

---

This invention relates to chondroitin sulphuric acid salts of therapeutic interest, and provides new salts of chondroitin sulphuric acids with compounds containing basic nitrogen atoms. The basic nitrogen-containing compounds may be, for example, primary, secondary or tertiary amino compounds or quarternary ammonium compounds. Preferred basic nitrogen-containing compounds are (carboxymethyl) trimethylammonium hydroxide inner salt and pyridoxine.

Among the different forms of chondroitin sulphuric acids, the forms A and C are preferred for their high therapeutic activity.

The compounds of the invention may be prepared by directly reacting chondroitin sulphuric acids obtained by any usual technique as for instance ion-exchange route— on the selected basic compound. The reaction occurs in an aqueous solution at room temperature.

Chondroitin sulphuric acids, forms A and C, are commercially available under the form of their sodium salts; however, these products are generally not of a high purity grade and preferably have to be purified. Should it be the case, the purification process consists in:

dissolution under stirring of the sodium chondroitin sulphate in water at about 60° C., at a concentration of about 100 g. per litre; the warm solution thus obtained is filtered under pressure.
precipitation of sodium chondroitin sulphate; the previously obtained solution is warmed up to 90° C. and there is then added 1.5 volume of warm ethyl alcohol under stirring; stirring is maintained for some hours and also during cooling of the mixture which must be very slow (10/12 hours).
Sodium chondroitin sulphate is separated by direct sedimentation which yields about 95% of the total product and by centrifuging the supernatant liquor which yields the other 5%.

The two fractions are mixed and redissolved in warm water. The solution is allowed to cool and can be used either for immediate reaction according to the invention or lyophilized, if not to be used immediately. This process is equally applicable to the A and C forms of chondroitin sulphuric acid.

These new compounds are of interest in the therapeutic field as powerful and reliable anti-atheromatic agents.

This invention is illustrated by the following examples.

EXAMPLE 1

(Carboxymethyl) trimethylammonium hydroxide chondroitin sulphate (A)

30 g. of sodium chondroitin sulphate, form A, were dissolved in 150 ml. of water and slowly passed through a ion exchange unit filled with Amberlite IR 120 (Amberlite is a registered trademark). As soon as the emerging solution which contained chondroitin sulphuric acid, had an acidic pH, it was directly poured whilst stirring into an aqueous solution of 50 g. of (carboxymethyl) trimethylammonium hydroxide inner salt in 50 ml. of water. This solution was evaporated under reduced pressure at a temperature not exceeding 50° C. to give a yellow residue which was retreated by methanol. After washing with methanol and then with ether there were obtained 26 g. of (carboxymethyl) trimethylammonium hydroxide chondroitin sulphate. Yield 70% by weight. Decomposition occurs at about 220° C. and melting point cannot be determined.

EXAMPLE 2

(Carboxymethyl) trimethylammonium hydroxide chondroitin sulphate (C)

The same operative conditions as in Example 1 applied also to the synthesis of (carboxymethyl) trimethylammonium hydroxide chondroitin sulphate (C). The difference between the two products is very thin. Sodium chondroitin sulphate (A) differs from sodium chondroitin sulphate (C) by some peaks in the U.V. spectrum. It is easier to check the starting materials than the final (carboxymethyl) trimethylammonium hydroxide chondroitin sulphate. Due to the nature of the difference of formulae between A and C forms, there is no risk of transposition during the reaction of synthesis. Yield is 72% by weight and decomposition occurs at about 210° C. so that melting point cannot be determined.

EXAMPLE 3

Pyridoxine chondroitin sulphate (C)

Proceeding as in Example 2 with 30 g. of sodium chondroitin sulphate, form C, dissolved in 150 ml. of water there were treated 60 g. of pyridoxine base dissolved in 0.5 litre of water. There were thus obtained 26.3 g. of pyridoxine chondroitin sulphate. Yield 67%. Decomposition occurs at about 210/220° C. and melting point cannot be determined.

EXAMPLE 4

Pyridoxine chondroitin sulphate (A)

The same technique as in Example 3 is used but replacing sodium chondroitin sulphate C by sodium chondroitin sulphate A. Yield is 69% by weight and decomposition occurs at about 210/220° C. so that melting point cannot be determined.

TOXICITY

The toxicity has been determined for the 4 compounds of the examples on mice per os and I.P. injection. Per os no death has occurred at 4.5 g./kg. which is the maximum dose administrable to a mouse. By I.P. route, the compound of Example 1 has a LD 50 of 1.2 g./kg., the compounds of Example 2 has a LD 50 of 1.25 g./kg. whereas no LD 50 could be determined for compounds of Examples 3 and 4 for which no death has occurred at 2.10 g./kg.

PHARMACOLOGY (1) The anti-atheromatic action has been proved by the method of experimental induction of myocardial infarction and necrosis-degeneration in rats by isoproterenol. The experimentation has been conducted on 80 Wistar rats (10 controls treated by isoproterenol, 10 controls receiving no treatment at all, 10 treated by each compound synthesized, 10 by sodium chondroitin sulphate form A and 10 by sodium chondroitin sulphate form C). The controls have received 100 mg. per kg. of isoproterenol alone. The six remaining lots were each treated by respectively 1 g./kg. of one of 1 g./kg. of the four compounds according to the invention and the two forms of starting material sodium chondroitin sulphates, for purpose of comparison.

The rats of each lot are killed, half after 24 hours and the remaining half after 48 hours. Immediately from the macroscopic examination of the animals, it can be noticed that in the controls treated by isoproterenol the coronary arteritis are thinner than in the controls which have not been treated at all and their myocard is ischemic. The animals treated by isoproterenol plus any of the six tested compounds look like the non-treated animals. It can be concluded from this experimentation that the 6 compounds tested present the same favorable anti-atheromatic action.

(2) A further experimentation on the agglomeration of platelets has been undertaken with the 6 compounds used in the preceding experimentation. It has been noted that for the inhibitory action on the induction of the agglomeration of platelets by collagen, at a dose of 1 mg. per ml., the 4 compounds of the invention inhibit the agglomeration of platelets; a dose of 4 mg. per ml. is necessary for the sodium chondroitin sulphate form A or C. Turning now to the agglomeration induced by the other 3 factors (ADP, adrenalin and fibrinogen) only the 4 compounds of the invention have an activity. As a conclusion of this experimentation the 4 compounds of the invention revealed a far better activity than the well known sodium chondroitin sulphate forms A and C.

POSOLOGY IN HUMAN USE

For the treatment in human medicine, the doses to be used per os are 1.5 g. to 10 g. per diem; 10 g. per diem represent an attack dose when starting the treatment and 1.5 g. is the normal routine administration.

The compounds of the invention can be dosed in gelatine capsules or in tablets containing 0.5 g. of active material associated with an appropriate inert carrier.

For administration by injection route, the selected compound is lyophilized in phials containing 0.5 g. of the same. Doses to be administered I.P. after dissolution in an appropriate solvent are 0.5 g. to 3 g. per diem.

What is claimed is:
1. A salt of chondroitin sulphuric acid selected from the group consisting of the A and C forms, with a compound of the group consisting of (carboxymethyl) trimethylammonium hydroxide inner salts and pyridoxine base.
2. (Carboxymethyl) trimethylammonium hydroxide chondroitin sulphate (A).
3. (Carboxymethyl) trimethylammonium hydroxide chondroitin sulphate (C).
4. Pyridoxine chondroitin sulphate (C).
5. Pyridoxine chondroitin sulphate (A).

References Cited
UNITED STATES PATENTS 2,931,753  4/1960  Chesbro et al. _____ 260—209 R
3,405,120  10/1968  Kawano et al. _____ 260—234 R ELBERT L. ROBERTS, Primary Examiner
J. R. BROWN, Assistant Examiner U.S. Cl. X.R.
424—180

UNITED STATES PATENT OFFICE
CERTIFICATE OF CORRECTION

Patent No. 3,719,665    Dated  March 6, 1973

Inventor(s)  Albert H. Beaufour and Andre Esanu

It is certified that error appears in the above-identified patent and that said Letters Patent are hereby corrected as shown below:

In Column 1 before the classification data insert

--Foreign Application Priority Data

September 30, 1970 British......70 46411--

Signed and sealed this 27th day of November 1973.

(SEAL)
Attest:

EDWARD M. FLETCHER, JR.    RENE D. TEGTMEYER
Attesting Officer           Acting Commissioner of Patents